No. 833,336. PATENTED OCT. 16, 1906.
T. B. PORTER.
SCRAPING POINT.
APPLICATION FILED SEPT. 23, 1905.
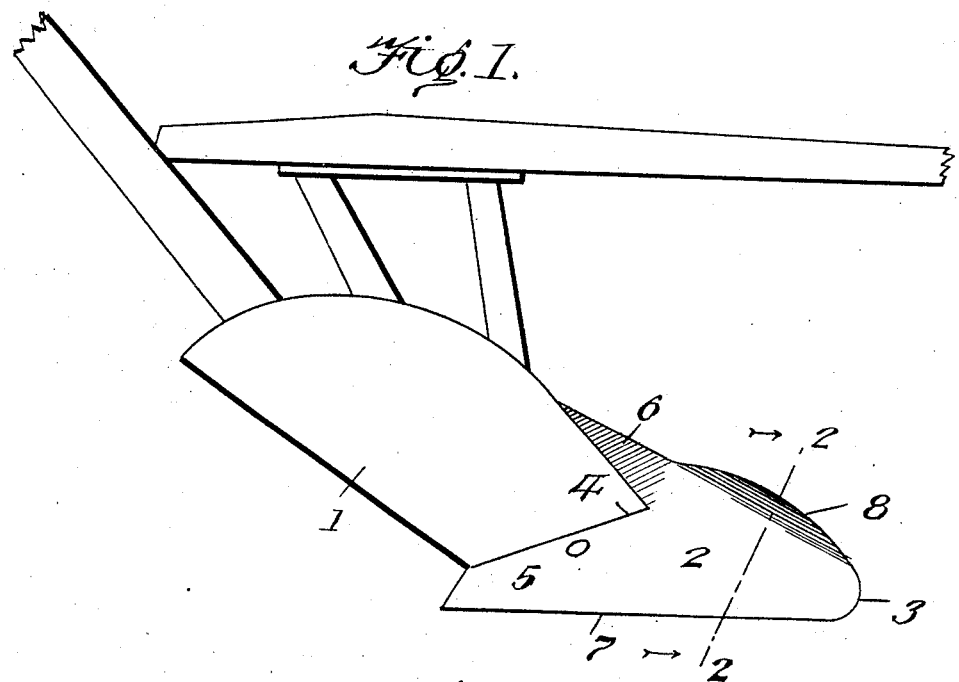
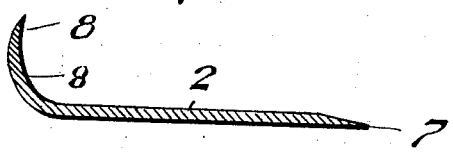
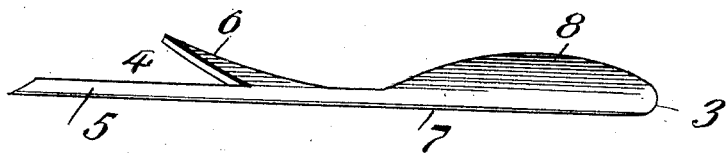
Witnesses
Geo. Ackman Jr.
Bernard P. Vashon.
Inventor
T. B. Porter,
By Geo. S. Vashon
Attorney
THE NORRIS PETERS CO., WASHINGTON, D. C.

UNITED STATES PATENT OFFICE.

THOMAS B. PORTER, OF FORREST CITY, ARKANSAS.

SCRAPING-POINT.

No. 833,336.   Specification of Letters Patent.   Patented Oct. 16, 1906.

Application filed September 23, 1905. Serial No. 279,812.

*To all whom it may concern:*

Be it known that I, THOMAS B. PORTER, a citizen of the United States, residing at Forrest City, in the county of St. Francis and State of Arkansas, have invented new and useful Improvements in Scraping-Points, of which the following is a specification.

This invention relates to scrapers for cultivating cotton, corn, potatoes, and other plants, and refers particularly to a point for attachment to a plow and embodying structural features to render it more efficient in performing its function and readily applicable to plows of different makes.

The improved scraping plow-point has an outwardly-curved guard at its inner edge near the front terminal to permit it to run close to plants without injury to the latter and effectively turn or throw out the scrapings or separated growths.

The invention consists in the construction and arrangement of the several parts, which will be more fully hereinafter set forth in preferred form.

In the drawings, Figure 1 is a perspective view of a portion of a plow, showing the improved point applied thereto. Fig. 2 is a transverse vertical section on the line 2 2 of Fig. 1. Fig. 3 is a side elevation of the point looking inwardly from the outer edge.

Similar numerals of reference are employed to indicate corresponding parts in the several views.

The numeral 1 designates a moldboard having suitable guards and attaching means projecting upwardly therefrom and reduced or shouldered at its lower forward extremity, as usual, to receive and support the point. The improved point consists of a body 2, of preferred width and converged regularly toward its front rounded terminal 3, which is sharpened. The rear extremity of the body is formed in the present instance with an angular recess 4 to fit snugly against the correspondingly-shaped forward extremity of the moldboard; but the contour of this recess may be varied to accommodate differences in shape of the moldboard end to which it is applied. The recess 4 provides an outer straight extension 5 and an inner arm 6, the latter being curved and tapered to a point to reduce the inward projection thereof at the inner portion of the moldboard. It will be seen that from the rounded terminal 3 to the end of the extension 5 an elongated practically straight scraping edge 7 is provided, said edge being reduced to render it effective in scraping operations. This edge regularly continues into the rounded terminal 3, and the latter operates as an advance scraping means. The inner portion of the point from the terminal 3 rearwardly a preferred distance has the edge rolled or curved outwardly to form a guard 8, which operates to shield the plants, permits the point and moldboard to be run closer to the plants, and turns the removed growths outwardly and causes them to move rearwardly and downwardly over the point.

It will be noted by reference to Fig. 1 that the upwardly-extending laterally and longitudinally curved guard 8 terminates approximately at the medial vertical line of the share, the object of this arrangement being such that it will be thoroughly effective in directing the soil toward the moldboard, the resistance of passage through the soil being materially reduced, and positive severance of the roots will be assured. Furthermore, such construction will minimize the strain on the share and correspondingly reduce liability to breakage.

Having thus described the invention, what is claimed as new is—

A plowshare having a continuous straight reduced scraping edge, and having its rear end portion provided with a straight extension and a curved pointed arm, and its forward end portion rounded and provided with an upwardly-extending laterally and longitudinally curved guard terminating approximately at the medial vertical line of the share, substantially as specified.

In testimony whereof I affix my signature in presence of two witnesses.

THOMAS B. PORTER.

Witnesses:
GEO. B. PETTUS,
E. A. ROLFE.